(12) United States Patent
Abuelsaad et al.

(10) Patent No.: US 10,339,133 B2
(45) Date of Patent: Jul. 2, 2019

(54) AMORPHOUS DATA PREPARATION FOR EFFICIENT QUERY FORMULATION

(71) Applicant: International Business Machines Corporation, Armonk, NY (US)

(72) Inventors: Tamer E. Abuelsaad, Somers, NY (US); Gregory Jensen Boss, Saginaw, MI (US); Craig Matthew Trim, Sylmar, CA (US); Albert Tien-Yuen Wong, Whittier, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 14/076,809

(22) Filed: Nov. 11, 2013

(65) Prior Publication Data

US 2015/0134677 A1    May 14, 2015

(51) Int. Cl.
*G06F 16/28* (2019.01)
*G06F 16/242* (2019.01)
*G06F 16/2458* (2019.01)

(52) U.S. Cl.
CPC ........ *G06F 16/242* (2019.01); *G06F 16/2462* (2019.01); *G06F 16/283* (2019.01)

(58) Field of Classification Search
CPC .......................... G06F 17/30592; G06F 16/242
See application file for complete search history.

(56) References Cited

U.S. PATENT DOCUMENTS

| 6,223,171 | B1* | 4/2001 | Chaudhuri et al. ........... 707/718 |
| 6,282,537 | B1 | 8/2001 | Madnick et al. |
| 6,707,463 | B1 | 3/2004 | Gibson et al. |
| 7,065,588 | B2 | 6/2006 | Konda et al. |

(Continued)

FOREIGN PATENT DOCUMENTS

| CN | 102289482 A | 12/2011 |
| EP | 001355237 A2 | 10/2003 |

(Continued)

OTHER PUBLICATIONS

Chen et al., "Efficient Approximate Top-K Query Algorithm Using Cube Index", 2011.*

(Continued)

*Primary Examiner* — Jeff A Burke
*Assistant Examiner* — Dawaune A Conyers
(74) *Attorney, Agent, or Firm* — Garg Law Firm, PLLC; Rakesh Garg; Christopher K. McLane

(57) ABSTRACT

A method, system, and computer program product for amorphous data preparation for efficient query formulation are provided. A normalized form of representing a set of data cubes is selected. The set of data cubes includes a first data cube conforming to first data representation and a second data cube conforming to a second data representation. The normalized form selects a third data representation to represent the data of each data cube in the set. A transformation is applied to the first data cube to represent the first data cube using the third data representation to create a normalized first data cube. A set of metadata elements corresponding to the normalized first data cube is computed. The normalized first data cube and the metadata of the normalized first data cube are saved in a data store.

17 Claims, 8 Drawing Sheets

(56) References Cited

U.S. PATENT DOCUMENTS

| | | | |
|---|---|---|---|
| 7,185,016 B1* | 2/2007 | Rasmussen | 707/100 |
| 7,593,013 B2 | 9/2009 | Agutter et al. | |
| 7,702,627 B2* | 4/2010 | Ahmed et al. | 707/999.005 |
| 7,933,867 B1* | 4/2011 | Gui et al. | 707/624 |
| 8,150,850 B2 | 4/2012 | Herrnstadt | |
| 8,260,787 B2 | 9/2012 | Lam et al. | |
| 8,275,779 B2 | 9/2012 | Eggebraaten et al. | |
| 8,326,828 B2 | 12/2012 | Zhou et al. | |
| 8,352,510 B2 | 1/2013 | Bornhoevd et al. | |
| 2002/0169777 A1 | 11/2002 | Balajel et al. | |
| 2003/0018616 A1 | 1/2003 | Wilbanks et al. | |
| 2004/0215626 A1* | 10/2004 | Colossi | G06F 17/30312 707/100 |
| 2006/0020933 A1* | 1/2006 | Pasumansky et al. | 717/140 |
| 2008/0098045 A1 | 4/2008 | Radhakrishnan et al. | |
| 2008/0235254 A1 | 9/2008 | Chang et al. | |
| 2010/0121869 A1 | 5/2010 | Biannic | |
| 2010/0131456 A1* | 5/2010 | Williamson | 707/602 |
| 2011/0131216 A1 | 6/2011 | Chakravarthy et al. | |
| 2011/0307477 A1 | 12/2011 | Dasari et al. | |
| 2012/0005153 A1* | 1/2012 | Ledwich | G06Q 10/06 707/602 |
| 2012/0215763 A1 | 8/2012 | Hughes et al. | |
| 2012/0246154 A1 | 9/2012 | Duan et al. | |
| 2012/0290558 A1 | 11/2012 | Gruber | |
| 2012/0330926 A1 | 12/2012 | Rajan et al. | |
| 2013/0006964 A1 | 1/2013 | Hammerschmidt et al. | |
| 2013/0018900 A1 | 1/2013 | Cheng et al. | |
| 2013/0031613 A1 | 1/2013 | Shanabrook et al. | |
| 2013/0073589 A1 | 3/2013 | Smith et al. | |
| 2013/0132372 A1 | 5/2013 | Gilbert | |
| 2013/0138629 A1 | 5/2013 | Rehmattullah | |

FOREIGN PATENT DOCUMENTS

| | | | |
|---|---|---|---|
| EP | 1482431 | A2 | 1/2004 |
| EP | 1482431 | A2 | 5/2004 |
| EP | 1482431 | A2 | 12/2004 |
| EP | 1493101 | A2 | 1/2005 |
| EP | 1566010 | A4 | 4/2007 |
| EP | 1804171 | A2 | 7/2007 |
| EP | 2559223 | A1 | 2/2013 |
| WO | 2005006153 | A2 | 1/2005 |

OTHER PUBLICATIONS

Fisher et al., "Trust Me, I'm Partially Right: Incremental Visualization Lets Analysts Explore Large Datasets Faster", 2012.*

Fisher et al., "Incremental, Approximate Database Queries and Uncertainty for Exploratory Visualization", 2011.*

Stolte et al., "Polaris: A System of Query Analysis, and Visualization of Multidimensional Relational Databases", 2001.*

Si-Chi-Chin et al., "Query-based Text Normalization Selection Models for Enhanced Retrieval Accuracy", Association for Computational Linguistics, 19-26, Jun. 2010.

Bedini et al., Automatic Ontology Generation:State of the Art, 1-15, Dec. 1, 2012.

Nihalani et al., "Design of Intelligent layer for flexible querying in databases", 2009.

* cited by examiner

US 10,339,133 B2

AMORPHOUS DATA PREPARATION FOR EFFICIENT QUERY FORMULATION

TECHNICAL FIELD

The present invention relates generally to a method, system, and computer program product for data transformation. More particularly, the present invention relates to a method, system, and computer program product for amorphous data preparation for efficient query formulation.

BACKGROUND

A data store is a repository of amorphous data. Generally, amorphous data is data that does not conform to any particular form or structure. Typically, data sourced from several different sources of different types is amorphous because the sources provide the data in varying formats, organized in different ways, and often in unstructured form.

A data cube is a quantum of data that can be sold, purchased, borrowed, installed, loaded, or otherwise used in a computation. Several methods for querying amorphous data from one or more data stores are presently in use. Presently, all the amorphous data that is to be queried is first organized in a data structure with a suitable number of columns to represent all of the amorphous data, e.g., as a large multi-column table data cube, using any known technique for constructing such data structures. A query is then constructed corresponding to the columns represented in the data structure.

Querying amorphous data produces a result set that is also amorphous. A result set is data resulting from executing a query. Executing a portion of a query, or a sub-query, also results in a result set.

Normalization of data is a process of organizing the data. Structuring unstructured data, for example, casting or transforming amorphous data into some structured form, is an example of normalizing amorphous data.

SUMMARY

The illustrative embodiments provide a method, system, and computer program product for normalizing amorphous query result sets. An embodiment includes a method for amorphous data preparation for efficient query formulation. The embodiment selects a normalized form of representing a set of data cubes, wherein the set of data cubes includes a first data cube conforming to first data representation and a second data cube conforming to a second data representation, and wherein the normalized form selects a third data representation to represent the data of each data cube in the set. The embodiment applies a transformation to the first data cube to represent the first data cube using the third data representation to create a normalized first data cube. The embodiment computes a set of metadata elements corresponding to the normalized first data cube. The embodiment saves the normalized first data cube and the metadata of the normalized first data cube in a data store.

Another embodiment includes a computer usable program product comprising a computer usable storage device including computer usable code for amorphous data preparation for efficient query formulation. The embodiment further includes computer usable code for selecting a normalized form of representing a set of data cubes, wherein the set of data cubes includes a first data cube conforming to first data representation and a second data cube conforming to a second data representation, and wherein the normalized form selects a third data representation to represent the data of each data cube in the set. The embodiment further includes computer usable code for applying a transformation to the first data cube to represent the first data cube using the third data representation to create a normalized first data cube. The embodiment further includes computer usable code for computing a set of metadata elements corresponding to the normalized first data cube. The embodiment further includes computer usable code for saving the normalized first data cube and the metadata of the normalized first data cube in a data store.

Another embodiment includes a data processing system for amorphous data preparation for efficient query formulation. The embodiment further includes a storage device including a storage medium, wherein the storage device stores computer usable program code. The embodiment further includes a processor, wherein the processor executes the computer usable program code. The embodiment further includes computer usable code for selecting a normalized form of representing a set of data cubes, wherein the set of data cubes includes a first data cube conforming to first data representation and a second data cube conforming to a second data representation, and wherein the normalized form selects a third data representation to represent the data of each data cube in the set. The embodiment further includes computer usable code for applying a transformation to the first data cube to represent the first data cube using the third data representation to create a normalized first data cube. The embodiment further includes computer usable code for computing a set of metadata elements corresponding to the normalized first data cube. The embodiment further includes computer usable code for saving the normalized first data cube and the metadata of the normalized first data cube in a data store.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
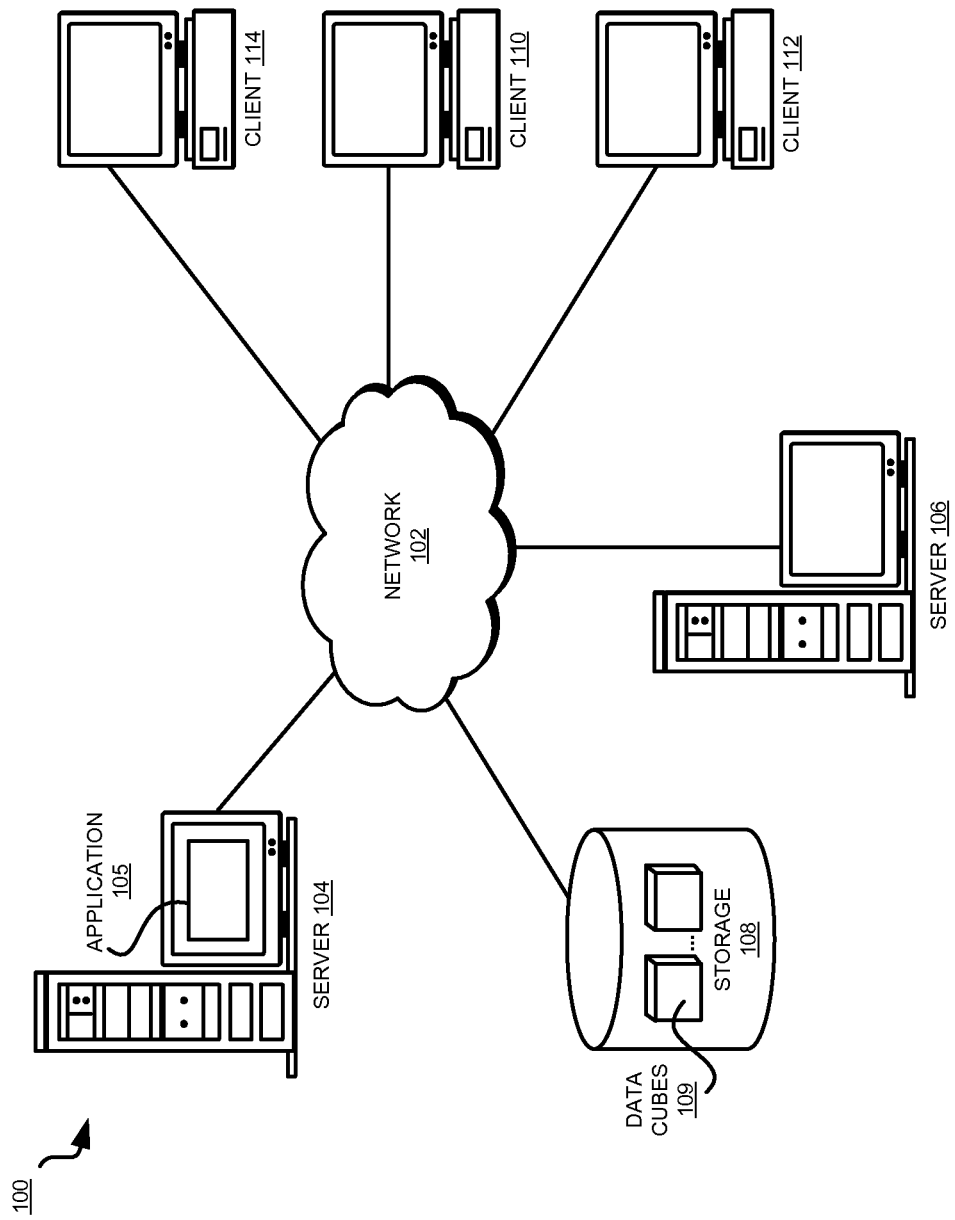
FIG. 1 depicts a block diagram of a network of data processing systems in which illustrative embodiments may be implemented.

Much like an application store contains applications, a data store according to the illustrative embodiments contains numerous data cubes. In a manner similar to obtaining an application from an application store for use on a device, a user can obtain one or more data cubes to use in the user's query. For example, a user can use a shopping cart application to select data cubes from a data store. The user can then buy, borrow, download, install, or otherwise use the selected data cubes in the user's query in the manner of an embodiment.

The illustrative embodiments recognize that when a query is directed to a data store, typically several data cubes have to participate in answering the query. For example, some but not all elements of the query may be available in one data cube, and one or more other data cubes may provide the remaining elements to completely answer the query made by a user or application (collectively, "user").

Presently, when multiple data cubes participate in answering a query, the inconsistent structures adopted in different data cubes—the amorphous nature of the data cubes—poses a computational problem. For example, some cubes may be organized in a relational organization conducive to accepting and answering queries in Structured Query Language (SQL) whereas some other data cubes may be organized in a non-relational structure that may not accept SQL queries.

Having to use amorphous combination of data cubes to answer a query is a common problem in querying data stores. Furthermore, often, the application or user who submits the query is in control of determining the data elements required to answer the query, and the language in which the query is presented. Therefore, the illustrative embodiments recognize that before a query can be executed against a set of more than one data cubes, the participant data cubes should be normalized to a common structure so that the resulting normalized data cubes can efficiently participate in answering a query.

The illustrative embodiments used to describe the invention generally address and solve the above-described problems and other problems related to querying amorphous data. The illustrative embodiments provide a method, system, and computer program product for amorphous data preparation for efficient query formulation.

An embodiment evaluates the differences in the native (original, as supplied by a data source) representations of two or more data cubes. The embodiment converts one or more of the data cubes from the native form to a normalized form. Conversions of different cubes from their respective native forms to the normalized form use combinations of one or more different transformations. The embodiment selects the normalized form and the conversion process for reaching the normalized form from a given native form of a cube based on one or more transformation rules.

For example, one example transformation rule considers whether a query requires the output in a particular form. If so, one embodiment selects the output form as the normalization form for the participating data cubes. As another example, another example transformation rule considers whether more than a threshold number of participating cubes are in a common native form. If so, an embodiment selects the common native form as the normalized form for the cubes that are in a different native form.

As another example, another transformation rule considers several normalized forms and their respective costs of transforming all or some of the participating cubes. An embodiment selects the most advantageous transformation and transforms the data cubes to the corresponding normalized form. For example, given a set of participant cubes, one transformation rule selects that normalized form which has the least computational cost of transformation (an example measure of advantageousness) associated therewith. Another embodiment determines the form that is most prevalent in a data store (another example measure of advantageousness) and selects that form as the normalization form. Another embodiment determines the form that is most requested output form of queries over a historical period (another example measure of advantageousness) and selects that form as the normalization form.

Another embodiment determines the form that is used by another data cube in the data store, where the cube in the data store and a cube to be transformed share more than a threshold level of similarity, e.g., similar dimensions or columns (another example measure of advantageousness). The embodiment selects the form of the similar cube as the normalization form. Another embodiment determines the form that was used to transform another data cube in the data store, where the cube in the data store and a cube to be transformed share more than a threshold level of similarity, e.g., similar dimensions or columns (another example measure of advantageousness). The embodiment selects the transformed form of the similar cube as the normalization form.

These examples of transformation rules are only described as examples without implying any limitation on the illustrative embodiments. Those of ordinary skill in the art will be able to conceive from this disclosure many other transformation rules for a similar purpose and the same are contemplated within the scope of the illustrative embodiments.

An embodiment tags a normalized cube with markers, such as by creating metadata for the normalized form of the data cube. As one example of the markers that can be inserted in the metadata of the normalized cube, an embodiment describes how much of the native cube data is present in the normalized cube. For example, a native cube may include pedabytes of data whose transformation may execute over a prolonged period. Before the transformation completes, a query might want to use the normalized cube that includes only a portion of the original native data cube.

As another example of the markers that can be inserted in the metadata of the normalized cube, an embodiment describes the columns carried over from the native form to the normalized form, the columns or dimensions computationally inserted into normalized form based on the data from the native form, the columns that are modified in some respect from the native form into the normalized form, or a combination thereof. As another example of the markers that can be inserted in the metadata of the normalized cube, an embodiment timestamps the transformation, so that when used for a query, a user can know the age of the data in the normalized form. An embodiment can add these, additional, or different, similarly purposed markers or tags into the metadata of the normalized cube.

When the data in a native data cube changes, such as when a data source refreshes a data cube, an embodiment determines the effects of the change on the normalized forms of the native data cube. Note that an embodiment can construct more than one normalized forms corresponding to a native data cube, and store those normalized forms in a data store.

When a data element, data organization, or a combination thereof change in a native data cube, an embodiment may be able to apply the change by altering an existing normalized form, may have to construct a completely new representation of the revised data in a new normalized form, or both. An embodiment updates the existing metadata when altering an existing normalized form, and creates new metadata when creating a new normalized form.

One embodiment performs the transformations to create normalized cubes in background in anticipation of queries. Another embodiment performs the transformations on demand when a query is presented.

An embodiment further presents a visual representation of the normalized cubes, the native cubes, the metadata, or a combination thereof, to guide a user in query construction. One example visualization presents different cubes as different visual shapes or sizes to give the user a visual sense of the amount of data in each selected cube.

Another example visualization presents visual clues about a cost of constructing a part of the query using certain entities from certain cubes. For example, a query or a part thereof, that can execute in less than a threshold amount of time is coded in one color, and a query or a part thereof, that is expected to execute in more than a threshold amount of time is coded in another color. The cost of a query portion allows a user to consider alternate query construction options to meet a cost goal.

Another example visualization presents visual clues about the saved normalized cube containing less than the entire data of the native cube. An application or a user can use this information about the partial nature of the saved normalized cube to determine an accuracy of a part of the query using certain entities from certain cubes. For example, a query or a part thereof, that uses a normalized cube may be faster but only accurate to less than a threshold degree when using a saved normalized cube versus a native cube because the amount of data in the normalized cube may be less than the amount of data in the native cube. Accuracy of less than a threshold degree of accuracy is coded in one color, and accuracy of more than the threshold degree is coded in another color. The accuracy of a query portion allows a user to consider alternate query construction options to meet an accuracy goal.

When the visualization presents visual clues about the saved normalized cube containing less than the entire data of the native cube, an application or a user can use this information about the partial nature of the saved normalized cube to also determine a precision of a part of the query using certain entities from certain cubes. For example, a query or a part thereof, that uses a normalized cube may be faster but less precise than a threshold degree when using a saved normalized cube versus a native cube because certain entities present in the data in the native cube may not be included in a particular saved normalized representation. Precision of less than a threshold degree of precision is coded in one color, and precision of more than the threshold degree is coded in another color. The precision of a query portion allows a user to consider alternate query construction options to meet a precision goal.

The illustrative embodiments are described with respect to, certain data formats, structures, entities, relationships, rules, tags, markers, metadata, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
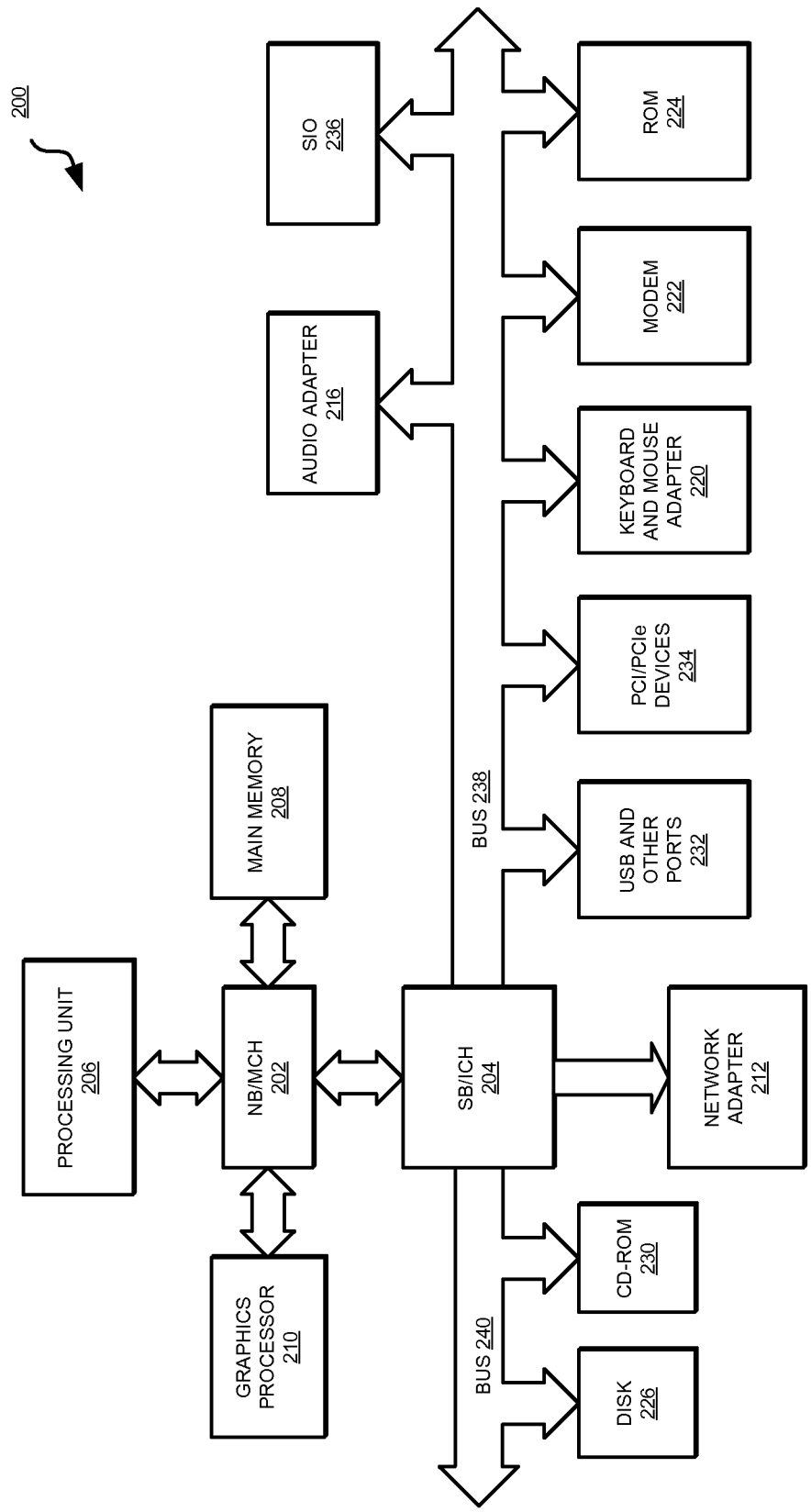
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Application 105 in server 104 implements an embodiment described herein. Data cubes 109 are cubes located in a data store, such as a data store using storage 108. Data cubes 109 are amorphous in that one data cube in data cubes 109 is organized differently and according to a different standard or specification than another data cube in data cubes 109. Some or all of data cubes 109 can be normalized, updated, changed, marked, tagged, metadata-supplemented, visualized, or a combination thereof, by application 105 using an embodiment described herein.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations.

For example, data processing system 200 also may be a tablet computer, laptop computer, or telephone device in addition to taking the form of a PDA.

Figure 3:
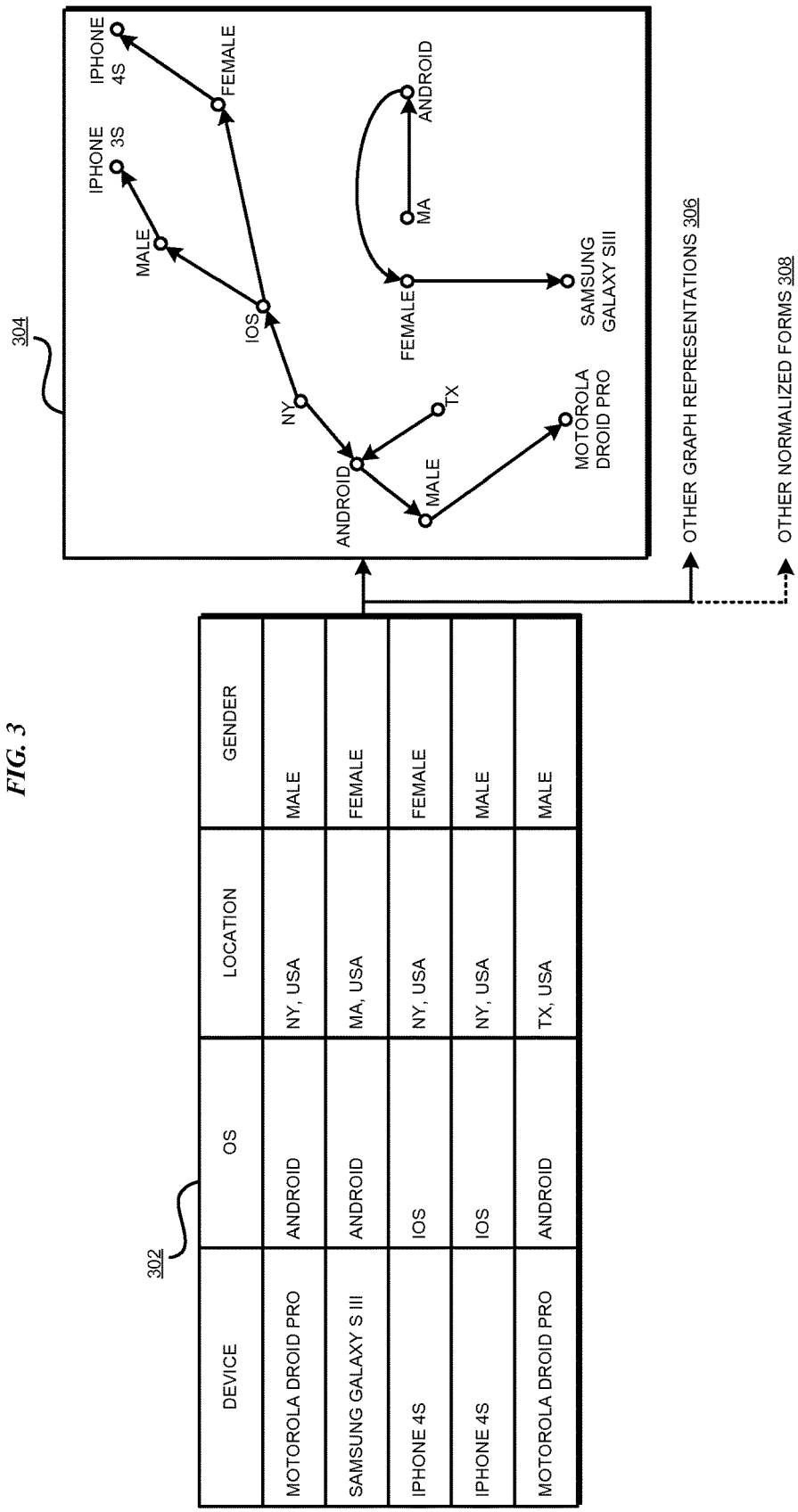
FIG. 3 depicts a block diagram of a data cube transformation process in accordance with an illustrative embodiment.

With reference to FIG. 3, this figure depicts a block diagram of a data cube transformation process in accordance with an illustrative embodiment. Table 302 is a simplistic example representation of a cube, such as a relational cube in amorphous cubes 109 in FIG. 1.

Assume a data source provides data for a cube that is represented in its native form as relational table 302 (hereinafter, cube 302). Further assume that cube 302 participates with certain other cubes (not shown) that are represented in a non-relational native form.

Only as an example, and without implying any limitation thereto, assume that a suitable normalization form for all participating cubes is a directional graph. For example, an embodiment determines that cube 302 should be normalized to a directional graph form because another participating cube is in a directional graph form. As another example, an embodiment determines that cube 302 should be normalized to a directional graph form because a similar cube was also normalized in a directional graph form earlier.

As another example, an embodiment determines that cube 302 should be normalized to a directional graph form because a query is requesting an answer in a directional graph form. As another example, an embodiment determines that cube 302 should be normalized to a directional graph form because a directional graph form is most suited for the type or language of present or expected query. Generally, an embodiment selects a normalized form using these or other transformation rules in a similar manner.

Using one or more of these or other similarly purposed transformation rules, an embodiment, such as in application 105 in FIG. 1, transforms cube 302 from a native relational form to a directional graph form of graph 304. While all entities from cube 302 are depicted in graph 304, such may not always be the case. Some forms of native cubes may not lend themselves to a clean one-to-one transformation. Accordingly, an embodiment may transform a different cube 302 into more than one graph representations including graphs 304 and 306, one or more other normalized forms, such as comma separated values (CSV) 308, or a combination thereof.

A user can then use graph 304 alone or in combination with one or more graphs from graphs 306 in formulating a query. Alternatively, the user can use another normalized form 308 in the query.

In some circumstances, more than one normalized forms of the same native cube, such as a combination of graph 304 and a normalized form from forms 308, can also be used for query construction within the scope of the illustrative embodiments. For example, a user may construct a query, different parts of which use different sub-combinations of cubes. The different parts could benefit from using different normalized forms of the same cube depending upon the constitution of their respective sub-combinations of cubes.

Figure 4:
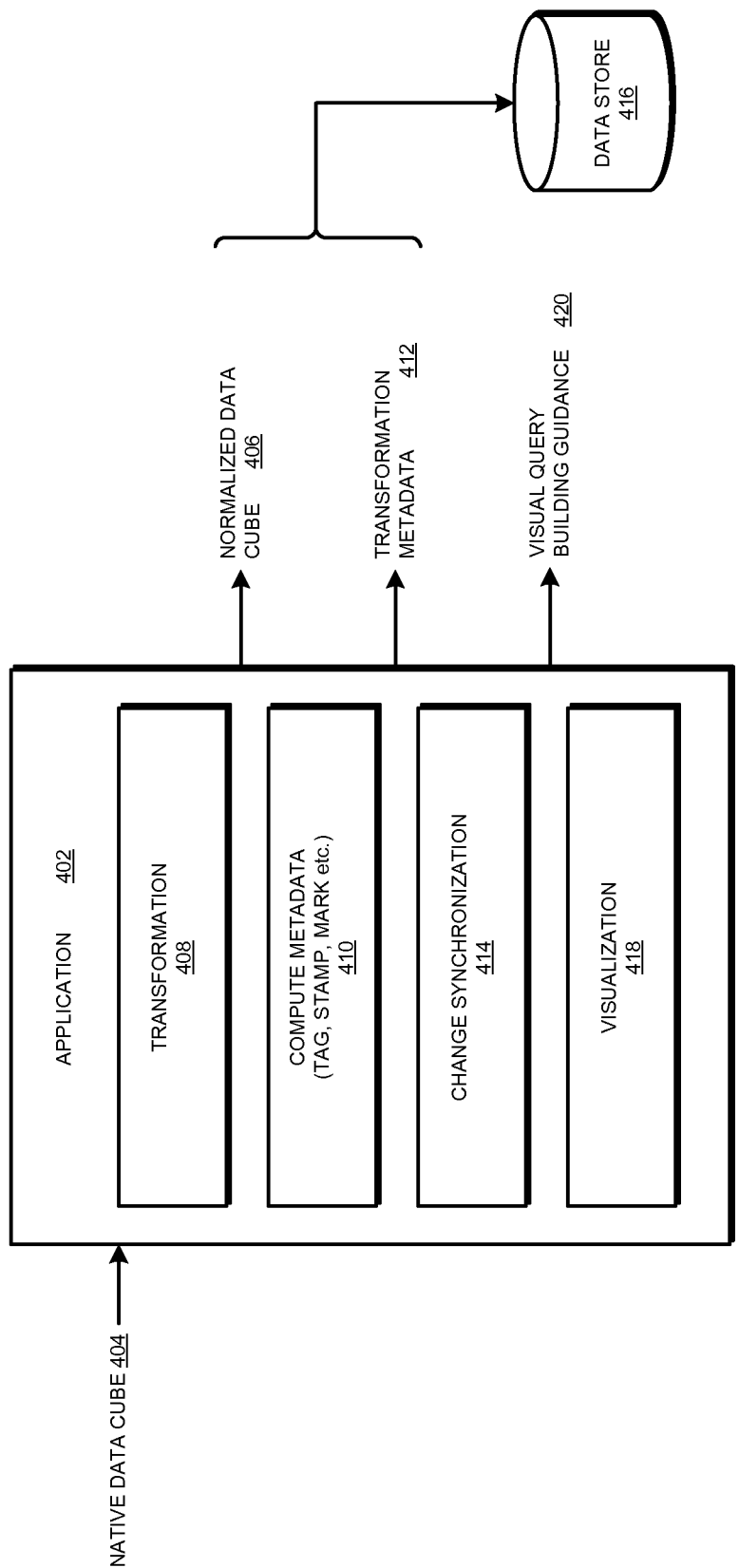
FIG. 4 depicts a block diagram of an example configuration for amorphous data preparation for efficient query formulation in accordance with an illustrative embodiment.

With reference to FIG. 4, this figure depicts a block diagram of an example configuration for amorphous data preparation for efficient query formulation in accordance with an illustrative embodiment. Application 402 is an example of application 105 in FIG. 1. Native data cube 404 is an example of cube 109 in FIG. 1. An example of cube 404 is cube 302 in FIG. 3.

Application 402 prepares, pre-processes, transforms, or normalizes cube 404 to result in normalized data cube 406. Graph 304 in FIG. 3 is an example of normalized cube 406.

Component 408 selects a transformation, such as by selecting one or more transformation rules in the manner described elsewhere in this disclosure. Component 408 applies the selected one or more transformations to native data cube 404 to create normalized data cube 406.

Component 410 computes the metadata elements to associate with normalized data cube 406. Component 410 outputs transformation metadata 412. As described elsewhere in this disclosure, metadata 412 can include one or more tags or markers. For example, a portion identifier in metadata 412 identifies which portions, columns, or dimensions of native cube 404 are represented in normalized cube 406, and in what form, to wit, unchanged, modified, or computed. As another example, a completeness indicator in metadata 412 indicates an amount of data from native cube 404 that has been transformed and appears in normalized cube 406. As another example, an age indicator in metadata 412 indicates when normalized cube 406 was created, or in other words, how old id the data in normalized cube 406.

These metadata elements in metadata 412 are only described as examples and not as limitations on the illustrative embodiments. Many other metadata elements will be conceivable from this disclosure and the same are contemplated within the scope of the illustrative embodiments.

Change synchronization component 414 receives or detects changes made to native cube 404. Component 414 determines a manner in which the changes to native cube 404 should be represented in normalized cube 406. As described elsewhere in this disclosure, in one embodiment, component 414 may modify normalized cube 406 to apply the changes made to native cube 404. In another embodiment, component 414 may create a new normalized cube (not shown) to apply the changes made to native cube 404. In another embodiment, component 414 may modify normalized cube 406 and add a new normalized cube (not shown) to apply the changes made to native cube 404.

Change synchronization component 414 also modifies metadata 412 according to the changes made to normalized cube 406 or a new normalized cube. For example, applying a change to normalized cube 406 may change the completeness indicator, portion identifier, age indicator, time stamp of normalization, or other metadata elements associated with normalized cube 406. Accordingly, component 414 updates metadata 412 to reflect the post-change-application values of those metadata elements in metadata 412. If component 414 creates new normalized cube in the process of applying the changes, component 414, in conjunction with component 410, creates new metadata for the new normalized cube in a manner similar to the creation of metadata 412 for normalized cube 406.

In one embodiment, application 402 stores or saves normalized cube 406, metadata 412, and any changes thereto, into data store 416. In one embodiment, data store 416 provides native data cube 404 as well.

Visualization component 418 presents a visual representation of normalized cube 406, and metadata 412, to guide a user in constructing an efficient query using normalized cube 406, as described earlier. In one embodiment, component 418 also creates and presents a visual representation of native cube 404 as well for a similar purpose, such as when a user selects native cube 404 in formulating the query.

For example, an embodiment presents a visual representation of the normalized cubes, the native cubes, the metadata, or a combination thereof, to guide a user in query construction. The visual representation takes the form of visual query building guidance 420. One example of visual query building guidance 420 presents different cubes as different visual shapes of sizes that are representative of an amount of data that would be subjected to the user's query in those cubes. For example, the visual representation of a cube may take the form of a geometrical n-dimensional shape, having a certain color or size to represent an amount of data.

Another example of visual query building guidance 420 presents visual clues about a cost of constructing a part of the query using certain entities from certain cubes. For example, the visual representation of costs may take the form of a color coded bar with a pointer sliding along the bar, such that the location of the pointer represents an estimated cost according to the scale of the bar.

Another example of visual query building guidance 420 presents visual clues about an accuracy of a part of the query using certain entities from certain cubes. For example, the visual representation of accuracy may take the form of a marked circular dial with a pointer moving on the dial, such that the location of the pointer represents an estimated accuracy according to the scale of the dial.

Another example of visual query building guidance 420 presents visual clues about a precision of a part of the query using certain entities from certain cubes. For example, the visual representation of precision may take the form of a graph with a axis-bound crosshair sliding along the graph, such that the location of the crosshair represents an estimated precision according to the scale of the graph.

These example of visual query building guidance 420, such as the example manner of visually representing an aspect of a cube or metadata or the example aspects thus represented, are described only for the clarity of the description and not as limitations on the embodiments. Those of ordinary skill in the art will be able to conceive many other forms of visual query building guidance 420 and things to visually represent towards a similar purpose, and the same are contemplated within the scope of the illustrative embodiments.

Figure 5:
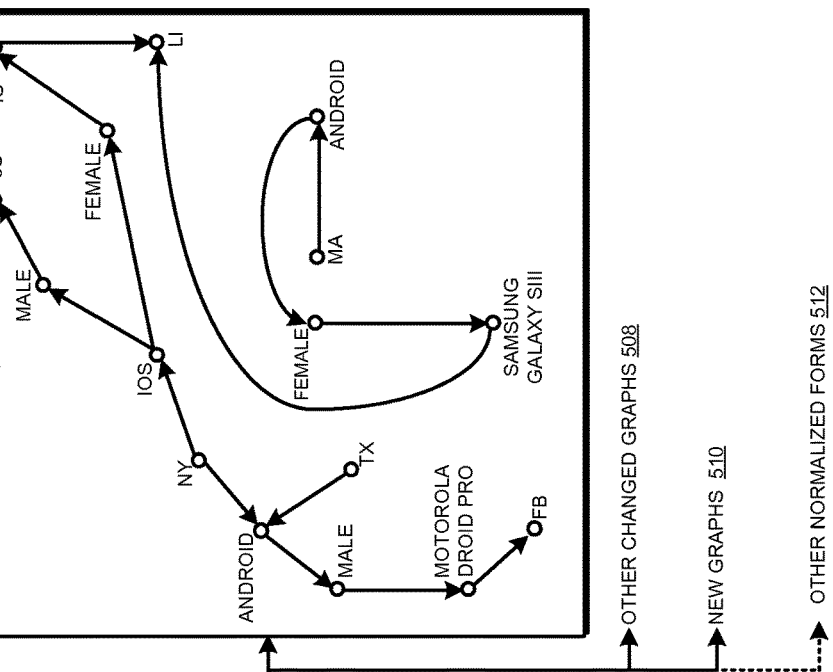
FIG. 5 depicts a block diagram of a change synchronization process in accordance with an illustrative embodiment.

With reference to FIG. 5, this figure depicts a block diagram of a change synchronization process in accordance with an illustrative embodiment. Table 502 is a simplistic example representation of a changed native cube, such as a changed form of cube 302 in FIG. 3.

Assume a data source provides changed data for native relational cube 302 of FIG. 3. The changed data is represented in its native form as relational table 502 (hereinafter, cube 502). Further assume that cube 302 of FIG. 3 is normalized to one or more directional graphs 304 of FIG. 3.

An embodiment determines that graph 304 should be modified to include the new data provided in column 506. Accordingly, the embodiment, such as implemented in component 414 in application 402 in FIG. 4, modifies graph 304 of FIG. 3 to result in graph 504 (hereinafter, change synchronized normalized cube 504).

Notice that example graph 304 in FIG. 3 was location-centric. In other words, the directional arrows originate from location nodes in graph 304, and terminate at one of the other nodes. Nodes other than location nodes either have only incoming arrows or have both incoming and outgoing arrows.

Accordingly, change synchronized normalized cube 504 in the form of the depicted changed graph continues to be location-centric. Component 414 can similarly modify other normalized cubes 508, such as other directional graphs which could be device-centric, OS-centric, or gender-centric.

In one embodiment, component 414 of FIG. 4 recognizes that changed data in cube 502 comprises a new column labeled "App," and therefore a new way of graphing the data. For example, now, component 414 can also construct an App-centric graph (not shown) as an alternate normalized cube 510 to normalize cube 502. Component 414 can similarly construct or modify other normalized forms 512 of cube 502.

Figure 6:
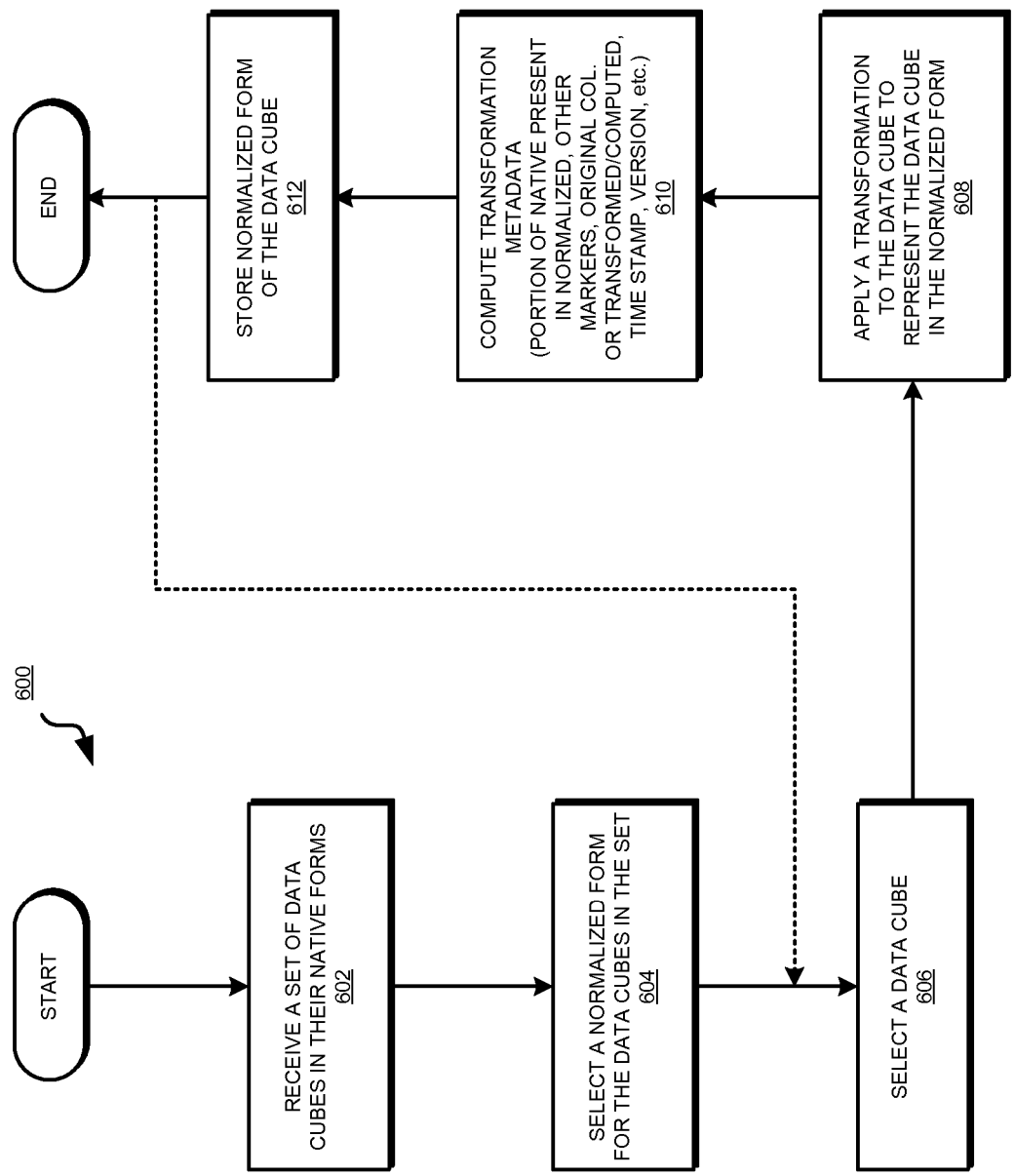
FIG. 6 depicts a flowchart of an example process of amorphous data preparation for efficient query formulation in accordance with an illustrative embodiment.

With reference to FIG. 6, this figure depicts a flowchart of an example process of amorphous data preparation for efficient query formulation in accordance with an illustrative embodiment. Process 600 can be implemented in application 402 in FIG. 4.

The application receives a set of data cubes in their native forms (block 602). The set may be received as a result of a query building exercise, upon a periodic or event-based review of a data store, or a combination thereof.

The application selects a normalization form for the data cubes in the set (block 604). The application selects a cube from the set (block 606). The application applies a transformation to the data cube to represent the cube in the normalized form (block 608).

The application computes the metadata associated with the normalized form constructed in block 608 (block 610). The metadata can include any number and types of elements, including but not limited to portion identifiers, age indicators, a time stamp of the transformation of block 608, and other tags or markers as may be suitable for a particular implementation.

The application stores the normalized form of the data cube (block 612). The application repeats block 606-612 for each cube received in the set at block 602. The application ends process 600 thereafter.

Figure 7:
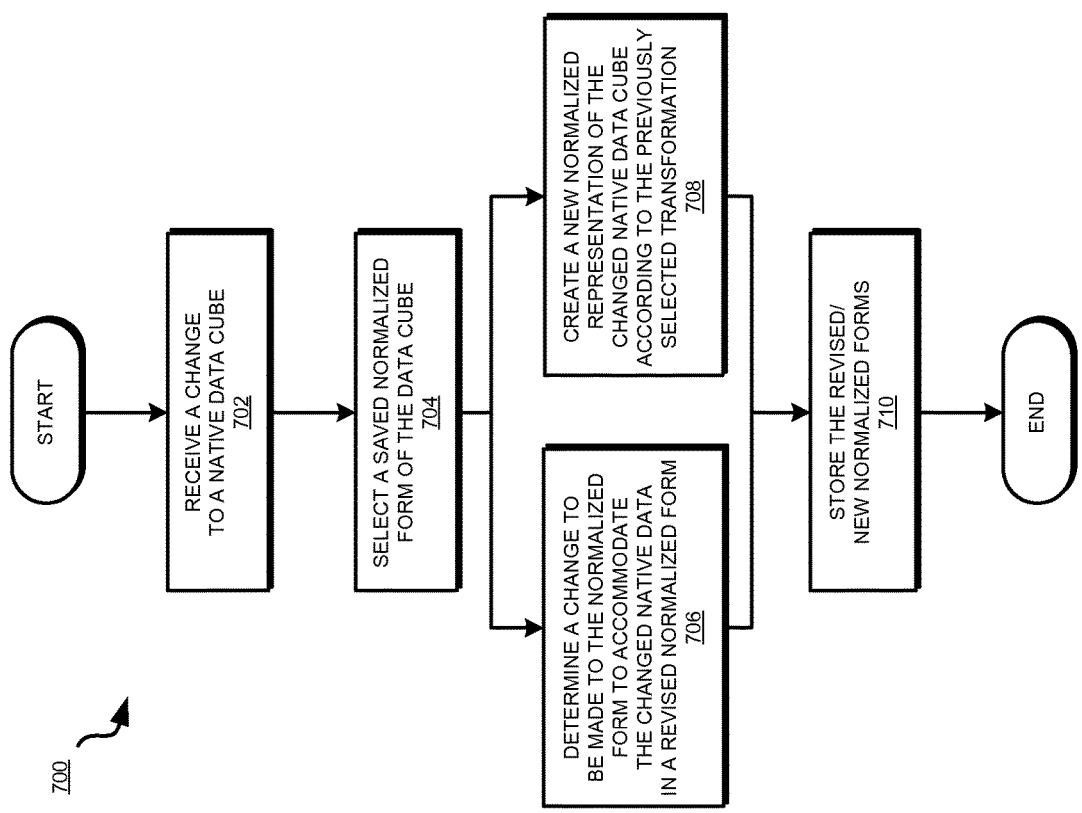
FIG. 7 depicts a flowchart of an example process of change synchronization in accordance with an illustrative embodiment.

With reference to FIG. 7, this figure depicts a flowchart of an example process of change synchronization in accordance with an illustrative embodiment. Process 700 can be implemented in application 402 in FIG. 4.

The application receives or detects a change to a native data cube (block 702). The application selects a saved normalized for of the data cube (block 704).

The application determines a manner of changing the normalized form to accommodate the changed native data, to form a revised normalized form (block 706). Alternatively, or in combination with block 706, the application created a new normalized representation of all or part of the changed native data cube (block 708). In one embodiment, the operation of block 708 uses a previously used transformation, such as the transformation used in constructing the saved normalized form of block 704. In another embodiment, the operation of block 708 selects a new transformation to construct the new normalized representation of block 708.

The application stores the revised or new normalized forms into a data store (block 710). The application ends process 700 thereafter.

Figure 8:
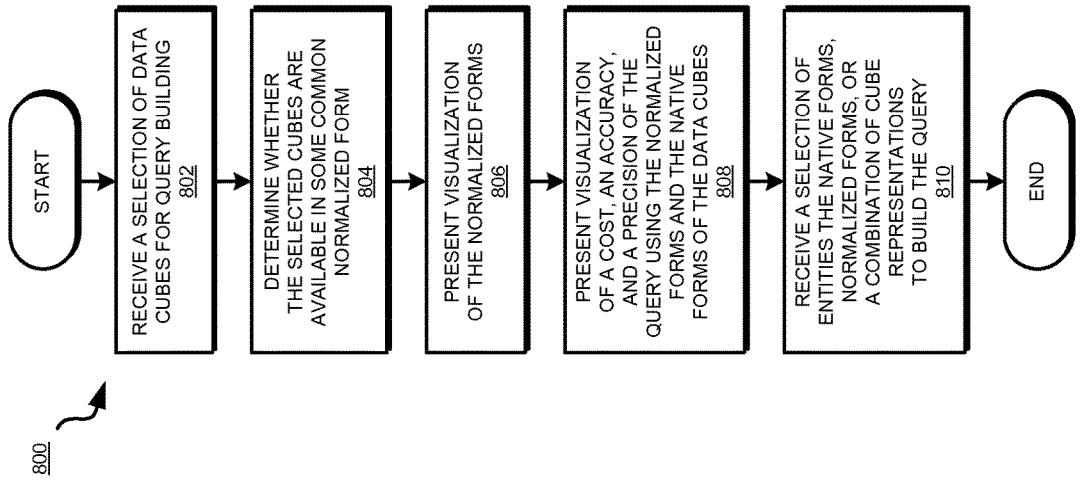
FIG. 8 depicts a flowchart of an example process of visually assisting a query formulation exercise in accordance with an illustrative embodiment.

With reference to FIG. 8, this figure depicts a flowchart of an example process of visually assisting a query formulation exercise in accordance with an illustrative embodiment. Process 800 can be implemented in application 402 in FIG. 4.

The application receives a selection of data cubes for query building (block 802). The application determines whether the selected cubes are available in some normalized form (block 804). In one embodiment, if one or more of the selected cubes are in their native form, the application executes process 600 to normalize those cubes. In another embodiment, the application omits block 804 and uses the selected cubes in the forms they exist.

When at least some of the selected cubes are in their normalized forms, the application presents a visualization of the cubes in normalized form (block 806). Some example ways of visualizing the normalized cubes are described elsewhere in this disclosure.

The application further presents a visualization of other metadata elements associated with a normalized cube (block 808). For example, and without implying a limitation thereto, an embodiment can present visual representations of the query cost, query accuracy, and query precision of the query with the selected cubes.

The application receives a selection of entities from the native cubes, normalized cubes, or a combination thereof, to build the query (block 810). The application ends process 800 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for amorphous data preparation for efficient query formulation.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for amorphous data preparation, the method comprising:
    selecting a normalized form of representing a set of data cubes, wherein the set of data cubes includes a first data cube from a first data source and conforming to first data representation, and a second data cube from a second data source and conforming to a second data representation, and wherein the normalized form selects a third data representation to represent the data of each data cube in the set;
    applying a transformation to the first data cube to represent the first data cube using the third data representation to create a normalized first data cube;
    creating, responsive to creating the normalized first data cube, a set of metadata elements corresponding to the normalized first data cube, wherein an element in the set of metadata is configured to indicate a precision of a part of a query, the precision of the part of the query being an estimate of precision achievable using a data entity from the normalized first data cube in the query;
    saving the normalized first data cube and the metadata of the normalized first data cube in a data store
    receiving, from the first data source, a change to the first data cube, the change comprising changed data, the changed data forming a changed first data cube;
        detecting the normalized first data cube in the data store;
        creating an additional normalized first data cube using the changed data, such that the additional normalized first data cube conforms to the third data representation;
    saving the additional normalized first data cube in the data store such that the data store includes both the normalized first data cube and the additional normalized first data cube; and
    presenting a visual representation of the normalized first data cube and a visual representation of the metadata in a visual environment for constructing the query, wherein the query uses the normalized first data cube.

2. The method of claim 1, further comprising:
    modifying the normalized first data cube, to form a modified normalized first data cube, such that the changed data is transformed to conform to the third data representation; and
    saving the modified normalized first data cube in the data store.

3. The method of claim 1, wherein the saving occurs before the transformation has normalized all data of the first data cube, forming a partially complete normalized first data cube, further comprising:
    setting an element in the set of metadata elements to indicate partial completeness of the normalized first data cube; and
    allowing the query to use the partially complete normalized first data cube.

4. The method of claim 1, wherein the transformation proceeds according to a transformation rule, further comprising:
    selecting the transformation rule from a set of transformation rules.

5. The method of claim 1, wherein the set of metadata elements comprises:
    an element to identify a manner of representing a portion of the first data cube in the normalized first data cube, wherein the manner of representing the portion is one of (i) as in the first data cube, (ii) modified from a value in the first data cube, and (iii) computed using a value from the first data cube.

6. The method of claim 1, wherein the set of metadata elements comprises:
    an element to indicate a level of completeness of the transformation, wherein the level of completeness corresponds to a portion of data of the first data cube that has been transformed into the normalized first data cube.

7. The method of claim 1, wherein the set of metadata elements comprises:
    an element to indicate an estimate of cost of using a data entity from the normalized first data cube in the query.

8. The method of claim 1, further comprising:
    determining that the query directed at the set of data cubes requires an output in the third data representation.

9. The method of claim 1, further comprising:
    determining that another data cube outside the set of data cubes has been normalized using the third data representation; and
    determining that the other data cube outside the set of data cubes is similar to the first data cube by at least a threshold degree.

10. The method of claim 1, further comprising:
    determining that another data cube outside the set of data cubes has been normalized using the third data representation; and
    determining that a cost of using the other data cube outside the set of data cubes as normalized using the third data representation is less than a cost of using the other data cube outside the set of data cubes as normalized using the second data representation.

11. The method of claim 1, wherein the third data representation is the same as the second data representation.

12. The method of claim 1, wherein the visual representation of the normalized first data cube comprises a graphical indication of an amount of data present in the normalized first data cube, and wherein the visual representation of the metadata comprises a graphical depiction of a cost of the query when using the normalized first data cube.

13. A computer usable program product comprising a computer usable storage device including computer usable code for amorphous data preparation, the computer usable code comprising:
  computer usable code for selecting a normalized form of representing a set of data cubes, wherein the set of data cubes includes a first data cube from a first data source and conforming to first data representation, and a second data cube from a second data source and conforming to a second data representation, and wherein the normalized form selects a third data representation to represent the data of each data cube in the set;
  computer usable code for applying a transformation to the first data cube to represent the first data cube using the third data representation to create a normalized first data cube;
  computer usable code for creating, responsive to creating the normalized first data cube, a set of metadata elements corresponding to the normalized first data cube, wherein an element in the set of metadata is configured to indicate a precision of a part of a query, the precision of the part of the query being an estimate of precision achievable using a data entity from the normalized first data cube in the query;
  computer usable code for saving the normalized first data cube and the metadata of the normalized first data cube in a data store
  computer usable code for receiving, from the first data source, a change to the first data cube, the change comprising changed data, the changed data forming a changed first data cube;
  computer usable code for detecting the normalized first data cube in the data store;
  computer usable code for creating an additional normalized first data cube using the changed data, such that the additional normalized first data cube conforms to the third data representation;
  computer usable code for saving the additional normalized first data cube in the data store such that the data store includes both the normalized first data cube and the additional normalized first data cube; and
  computer usable code for presenting a visual representation of the normalized first data cube and a visual representation of the metadata in a visual environment for constructing the query, wherein the query uses the normalized first data cube.

14. The computer usable program product of claim 13, further comprising:
  computer usable code for modifying the normalized first data cube, to form a modified normalized first data cube, such that the changed data is transformed to conform to the third data representation; and
  computer usable code for saving the modified normalized first data cube in the data store.

15. The computer usable program product of claim 13, wherein the computer usable code is stored in a computer readable storage medium in a data processing system, and wherein the computer usable code is transferred over a network from a remote data processing system.

16. The computer usable program product of claim 13, wherein the computer usable code is stored in a computer readable storage medium in a server data processing system, and wherein the computer usable code is downloaded over a network to a remote data processing system for use in a computer readable storage medium associated with the remote data processing system.

17. A data processing system for amorphous data preparation, the data processing system comprising:
  a storage device including a storage medium, wherein the storage device stores computer usable program code; and
  a processor, wherein the processor executes the computer usable program code, and wherein the computer usable program code comprises:
  computer usable code for selecting a normalized form of representing a set of data cubes, wherein the set of data cubes includes a first data cube from a first data source and conforming to first data representation, and a second data cube from a second data source and conforming to a second data representation, and wherein the normalized form selects a third data representation to represent the data of each data cube in the set;
  computer usable code for applying a transformation to the first data cube to represent the first data cube using the third data representation to create a normalized first data cube;
  computer usable code for creating, responsive to creating the normalized first data cube, a set of metadata elements corresponding to the normalized first data cube, wherein an element in the set of metadata is configured to indicate a precision of a part of a query, the precision of the part of the query being an estimate of precision achievable using a data entity from the normalized first data cube in the query;
  computer usable code for saving the normalized first data cube and the metadata of the normalized first data cube in a data store
  computer usable code for receiving, from the first data source, a change to the first data cube, the change comprising changed data, the changed data forming a changed first data cube;
  computer usable code for detecting the normalized first data cube in the data store;
  computer usable code for creating an additional normalized first data cube using the changed data, such that the additional normalized first data cube conforms to the third data representation;
  computer usable code for saving the additional normalized first data cube in the data store such that the data store includes both the normalized first data cube and the additional normalized first data cube; and
  computer usable code for presenting a visual representation of the normalized first data cube and a visual representation of the metadata in a visual environment for constructing the query, wherein the query uses the normalized first data cube.

* * * * *